United States Patent
Fan

(10) Patent No.: US 9,499,917 B2
(45) Date of Patent: *Nov. 22, 2016

(54) NON-FARADAIC ELECTROCHEMICAL PROMOTION OF CATALYTIC METHANE REFORMING FOR METHANOL PRODUCTION

(71) Applicant: GAS TECHNOLOGY INSTITUTE, Des Plaines, IL (US)

(72) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/076,445

(22) Filed: Nov. 11, 2013

(65) Prior Publication Data

US 2015/0129430 A1    May 14, 2015

Related U.S. Application Data

(63) Continuation-in-part of application No. 13/670,501, filed on Nov. 7, 2012, now Pat. No. 9,163,316, and a continuation-in-part of application No. 13/719,267, filed on Dec. 19, 2012.

(51) Int. Cl.
  *C25B 3/00*   (2006.01)
  *C25B 3/02*   (2006.01)
  *C25B 1/04*   (2006.01)

(52) U.S. Cl.
  CPC . *C25B 3/02* (2013.01); *C25B 1/04* (2013.01); *Y02P 20/132* (2015.11)

(58) Field of Classification Search
  CPC .................................. C25B 3/00; C25B 3/02
  USPC .................................................. 205/450, 452
  See application file for complete search history.

(56) References Cited

U.S. PATENT DOCUMENTS

| | | | |
|---|---|---|---|
| 4,462,876 A * | 7/1984 | DeLue | C25B 3/02 205/428 |
| 5,051,156 A | 9/1991 | Scharifker et al. | |
| 8,088,261 B2 | 1/2012 | Fan et al. | |
| 9,163,316 B2 * | 10/2015 | Fan | C25B 3/02 |
| 2008/0245660 A1 | 10/2008 | Little et al. | |
| 2014/0124380 A1 * | 5/2014 | Fan | C25B 1/04 205/350 |

FOREIGN PATENT DOCUMENTS

EP    2 730 638 A1    5/2014

OTHER PUBLICATIONS

European Search Report (2 pages) and EPO Form 1703 01.91 (5 pages) for Application No. EP 13 19 0431, Dec. 12, 2013, European Patent Office.

B. Lee et al., "Efficient and Selective Formation of Methanol From Methane in a Fuel Cell-Type Reactor", Jnl of Catalysis, 2011, v. 279, pp. 233-240.

* cited by examiner

*Primary Examiner* — Edna Wong
(74) *Attorney, Agent, or Firm* — Pauley Erickson & Kottis

(57) ABSTRACT

A method of converting methane to methanol at low temperatures utilizes a reactor including an anode, a cathode, a membrane separator between the anode and cathode, a metal oxide catalyst at the anode and a hydrogen recovery catalyst at the cathode. The method can convert methane to methanol at as rate exceeding the theoretical Faradaic rate due to the contribution of an electrochemical reaction occurring in tandem with a Faradaic reaction.

9 Claims, 2 Drawing Sheets

NON-FARADAIC ELECTROCHEMICAL PROMOTION OF CATALYTIC METHANE REFORMING FOR METHANOL PRODUCTION

This invention was made with government support under DE-AR0000307 awarded by the United States Department of Energy. The government has certain rights in the invention.

FIELD OF INVENTION

The present invention is directed to an improved method of converting methane to methanol. The method utilizes inorganic metal oxide cation intermediates as catalysts to oxidize methane to methanol at temperatures not greater than about 160° C. and suitably at room temperature.

BACKGROUND OF THE INVENTION

A Faradaic reaction is a heterogeneous charge-transfer reaction occurring at the surface of an electrode. Faradaic reactions are typically a defining feature of electrochemical cells. The production of methanol has conventionally been accomplished using a high temperature Fischer-Tropsch process operating at temperatures of about 150-300° C., typically using a transition metal catalyst. The Fischer-Tropsch process involves a collection of chemical reactions that convert a mixture of carbon monoxide and hydrogen into liquid hydrocarbons, including methane, methanol and various alkanes and alkanes. Thus, the production or methanol using this technique requires not only careful selection of the reactants, process conditions and catalysts to favor methanol conversion, but also the ability to separate methanol from the other reaction products.

Methanol can also be made from methane using a series of three reactions known as steam reforming, water shift, and synthesis performed sequentially as follows:

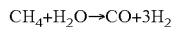

$CH_4 + H_2O \rightarrow CO + 3H_2$

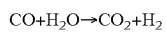

$CO + H_2O \rightarrow CO_2 + H_2$

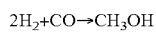

$2H_2 + CO \rightarrow CH_3OH$

Because the foregoing process requires three separate reactions to occur in sequence, significant amounts of by-products can again be formed which require separation from the methanol product. Also, the high reaction temperatures require significant amounts of energy input. There is a need or desire for an efficient, relatively low temperature process of manufacturing methanol directly from methane.

SUMMARY OF THE INVENTION

The present invention is directed to a high efficiency method of converting methane to methanol at temperatures less than about 160° C., suitably room temperature (25° C.) which avoids the need for a high temperature Fischer-Tropsch process. The method includes the step of providing a reactor including an anode, a cathode, a membrane, separator between the anode and cathode. A metal oxide catalyst is provided at the anode, and water or an aqueous solution is provided at the cathode. Methane is fed to the anode, and is converted to methanol and electrons in the presence of the metal oxide catalyst at the anode. The electrons are conducted to the cathode, where they transform at least some of the water to hydrogen gas and hydroxide ions. The hydroxide ions are transferred through the membrane separator to the anode, where they cause regeneration of the metal oxide catalyst. Methanol is recovered from the reactor at the anode, and hydrogen gas can be recovered at the cathode.

Because the reactor operates at low temperature, the energy input required to produce methanol from methane is less than would be required using a conventional Fischer-Tropsch process. Moreover, the method of the invention produces methanol at a production rate that exceeds the theoretical production rate of a purely Faradaic reaction. This is because the reactor is believed to produce methanol using both a Faradaic and a non-Faradic reaction, with the production rate being the sum of the rates for both reactions. The result is a relatively low-cost, low energy, efficient and easy to use method of converting methane to methanol.

DETAILED DESCRIPTION OF THE INVENTION

Figure 1:
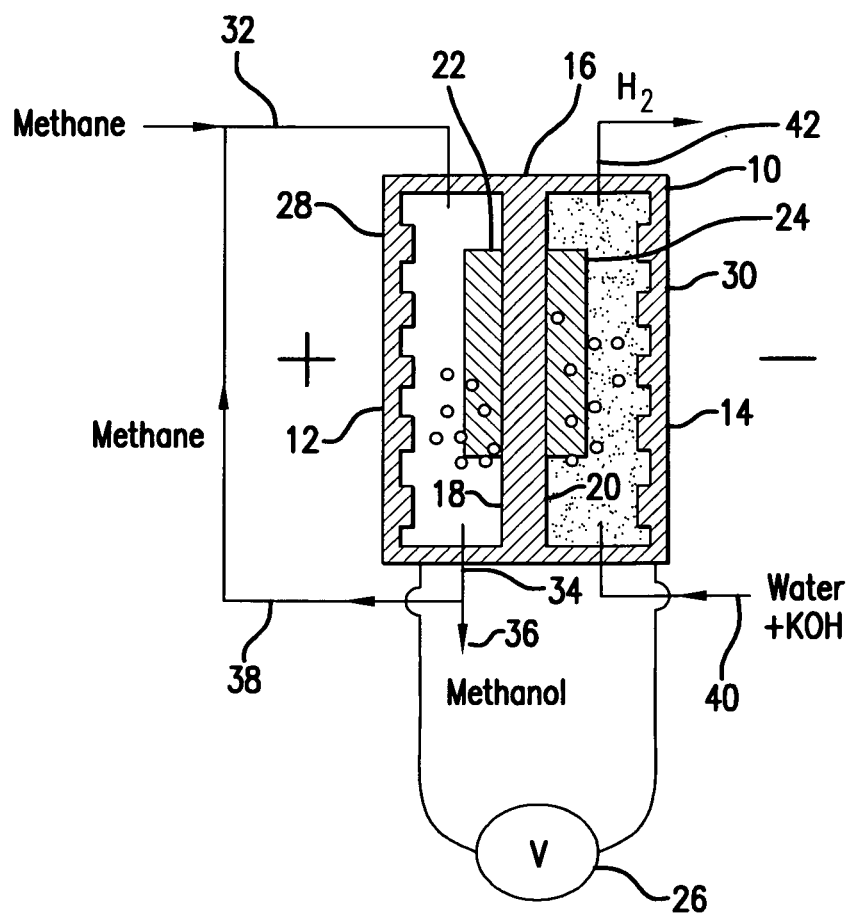
FIG. 1 schematically illustrates an electrochemical reactor used to practice the method of the invention.

Referring to FIG. 1, a reactor 10 is provided including an anode 12, a cathode 14, and a membrane separator 16 between the anode and cathode which can be an electrolyte membrane, and which has an anode side 18 and a cathode side 20. A metal oxide catalyst is disposed on the anode side 18, suitably on an anode electrode 22. A hydrogen recovery catalyst is disposed on the cathode side 20, suitably on a cathode electrode 24. A power supply 26 is connected to the anode 12 and cathode 14 of reactor 10 and can be set at various levels of voltage to generate an electric current flowing from the anode 12 to the cathode 14.

The anode electrode 22 can include an inert base material formed of carbon felt or cloth, fluoroethylene polymer (e.g., Teflon), nickel foam, anion exchange resin, or a combination thereof. The base material is coated with a metal oxide, or a combination of one or more metal oxides, that serve as catalysts. Suitable metal oxide catalysts include without limitation oxides and hydroxides of nickel, cobalt, copper, silver, platinum, gold, cerium, lead, iron, manganese, zinc, and combinations thereof. Specific examples include without limitation nickel hydroxide iron hydroxide, zinc hydroxide, manganese hydroxide, cobalt hydroxide, cobalt oxide, silver oxide platinum oxide, cerium oxide, zinc oxide, manganese oxide, iron oxide, and combinations thereof.

The cathode electrode 24 can include a base material formed of graphite or another inert material, or a combination thereof. The base material is coated with as metal that serves as a hydrogen recovery catalyst. Suitable metals include without limitation platinum. Group VIII metals of the Periodic Table of Elements (iron, ruthenium, osmium), and combinations thereof.

The membrane separator 16 can be an electrolyte membrane, and can be a porous polymer material that contains an electrolyte. Other suitable membranes include ion conductive materials that have low water transport. It is desirable to restrict the transport of water from the cathode to the anode, because excessive water in the anode dilutes the methanol product. Particularly suitable electrolyte membranes include anionic exchange membranes formed from alkaline ionomers, available from Tokuyama Corporation under the product name NEOSEPTA®. These membranes have high permselectivity to facilitate permeation of specific anions, low electric resistance, low diffusion of liquids, and high mechanical strength. Other examples of anionic exchange membranes include porous membranes sold by Freudenberg under the product name 700/30K, microporous membranes sold by Celgard under the product name CELGARD® 3400, and microporous membranes sold by Daramic under the product name DARAMIC® DP-34.14. Cationic exchange membranes can also be employed in the membrane separator 16. Cationic exchange membranes include without limitation proton exchange membranes formed of sulfonated tetratluoroethylene-based fluoropolymer copolymer, available from Aldrich Chemical Co. under the product name NAFION®.

The anode 12 and cathode 14 also include outer plates 28 and 30 which, in order to facilitate a stable process and long useful life of the reactor 10, are designed to be substantially free of corrosion and leakage. The plates 28 and 30 can be formed of a graphite which has been electroplated with nickel to seal the pores in the graphite to prevent any leakage or corrosion. The plates 28 and 30 can alternatively include a graphite layer and a second, protective metal alloy layer that has been sealed to the graphite layer.

During use of the reactor 10, methane is fed to the anode 12 via inlet stream 32 and is converted to methanol in the presence of the metal oxide catalyst. The chemical reactions at the anode may vary depending on the specific metal oxide catalyst and whether the environment is basic or acidic. In each case, the methane is oxidized to methanol and the metal oxide catalyst is converted to a non-catalytic state.

For example, the metal oxide catalyst can be a divalent metal hydroxide having the formula $M_1(OH_2)$, such as β-nickel hydroxide, $Ni(OH)_2$. In this case, the following chemical reactions would occur together at the anode, in a basic environment, and at room temperature without requiring added heat.

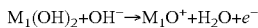

$$M_1(OH)_2 + OH^- \rightarrow M_1O^+ + H_2O + e^-$$

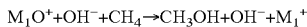

$$M_1O^+ + OH^- + CH_4 \rightarrow CH_3OH + OH^- + M_1^+$$

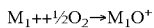

$$M_1 + \tfrac{1}{2}O_2 \rightarrow M_1O^+$$

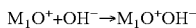

$$M_1O^+ + OH^- \rightarrow M_1O^+OH^-$$

The net chemical reaction at the anode, which is the sum of the individual reactions, yields a converted (non-catalytic) metal hydroxide, methanol, water, and free electrons.

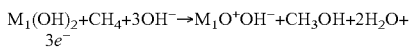

$$M_1(OH)_2 + CH_4 + 3OH^- \rightarrow M_1O^+OH^- + CH_3OH + 2H_2O + 3e^-$$

The foregoing net chemical reaction is Faradaic because of the generation of electrons. Additionally, a non-Faradaic electrochemical reaction occurs in the anode due to the electric current supplied to the reactor. The oxygen supplied to this reaction is the trace oxygen present in the anode from the inlet stream 32.

$$2CH_4 + O_2 \xrightarrow{\text{(electricity)}} 2CH_3OH$$

The non-Faradaic electrochemical reaction causes the total methanol production rate to exceed the theoretical maximum production rate from the Faradaic reaction using the metal oxide catalyst. For example, the methanol conversion rate may exceed the theoretical Faradic rate by at least about 10% or at least about 25%, or at least about 50% or more. The theoretical Faradaic production rate of methanol using the metal oxide catalyst is about 0.75 ml/A·min. Yet the total methanol production rate from the reactor 10, using a 1.4 volt power supply, has been up to about 1.20 ml/A·min, representing a surprising 60 percent improvement.

The methanol is recovered from the anode 12 of reactor 10 via the outlet stream 34, which also includes some unreacted methane. The methanol and methane are then separated, and the unreacted methane is recycled back to the inlet stream 32 via the recycle stream 38. The methanol product is recovered from the combined stream 34 via product stream 36. Because of the dual (Faradaic and non-Faradaic) reactions occurring in the anode 12, the conversion rate of methane to methanol can be quite high. The outlet stream 34 may contain at least about 10% by weight methanol and not More than about 60% by weight methane balanced by water vapor (30%), suitably at least about 40% by weight methanol and not more than about 20% by weight methane balanced by water vapor (40%). The methane gas works both as a carrier gas and a reactant.

The free electrons generated at the anode 12 are conducted to the cathode 14. Water or an aqueous solution is fed to the cathode 14 via inlet 40, typically as a basic or acidic solution. When an acidic solution is used at the cathode, a bipolar membrane separator 16 is used. The bipolar membrane separator contains an acidic polymer electrolyte overlapped on a basic polymer electrolyte. The basic polymer electrolyte faces the anode and the acidic polymer electrolyte faces the cathode. In the embodiment shown, a 25% w/w potassium hydroxide solution having a pH of about 14 or greater is fed to the cathode 14 via inlet 40. The free electrons interact with the water in the presence of the hydrogen evolution catalyst to generate hydroxide ions and hydrogen gas, the latter of which exits the cathode through outlet 42 and can be recovered for various uses. The hydroxide ions are then transferred through the membrane separator 16 back to the anode 12, where they react with and regenerate the used metal oxide catalyst.

The following chemical reactions typically occur at the cathode 14, where $M_2$ is the hydrogen recovery catalyst, platinum or a Group VIII metal.

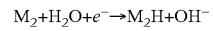

$$M_2 + H_2O + e^- \rightarrow M_2H + OH^-$$

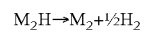

$$M_2H \rightarrow M_2 + \tfrac{1}{2}H_2$$

As indicated, the hydrogen recovery catalyst $M_2$ is self-regenerating. The net chemical reaction at the cathode 14, which is the sum of the foregoing reactions, converts the water to hydroxide ions and hydrogen.

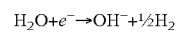

$$H_2O + e^- \rightarrow OH^- + \tfrac{1}{2}H_2$$

The overall sum of the Faradaic reactions occurring in the anode 12 and cathode 14 is the hydrolysis of methane.

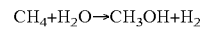

$$CH_4 + H_2O \rightarrow CH_3OH + H_2$$

The reactor 10, and the foregoing chemical reactions in the anode 12 and cathode 14, can occur at a temperature less than about 160° C., or less than about 100° C. or less than about 50° C., or at ambient temperature (about 25° C.). As shown above, the overall reaction uses only methane and water to produce methanol and hydrogen gas. The other reactants are used only to form intermediate compounds, and are continuously regenerated.

EXAMPLES

Examples 1-27

Using a reactor 10 designed as shown in FIG. 1, experiments were performed using various configurations for the anode electrode (including different metal oxide catalysts) and for the membrane separator. In each experiment, the cathode electrode was graphite coated with platinum. The hydrogen recovery catalyst (platinum) was constant. The reactor 10 had an area of about 30 cm² for the anode plate, the cathode plate and the membrane separator.

In the following Examples 1-27, the following acronyms or abbreviations are used.

| | |
|---|---|
| FEP: | Fluoroethylene polymer available from Delaware Specialty Distribution, LLC under the product name DuPont TEFLON ® FEP, TE-9568. |
| A3: | Anion exchange resin available from Tokuyama Corp. under the product name A3. |
| Carbon Cloth: | Available from Zoltek, under the product name PANEX ® 30. |
| Carbon Felt: | Available from SQL Carbon under the product name SIGRATHERM ®. |
| Tokuyama Membrane: | Anion exchange membrane composition with quaternary ammonium group, available from Tokuyama Corp. under the product name AEM A201. |
| Ni foam: | Available from international Nickel Company ("INCO") under the product name INCOFOAM ®. |
| Daramic membrane: | Anionic exchange membrane available from Daramic under the product name DARAMICV DP-34.14. |
| Vilene separator: | Anionic exchange membrane available from Freudenberg Nonwovens, LP under the product name FV-4365K. |
| NAFION ® 112 | Sulfonated tetrafluoroethylene cationic exchange membrane, available from Aldrich Chemical Co. |
| CG 135: | Polypropylene membrane available from Celgard. |

In each experiment, the reactor was supplied with a current of 8 mA/cm² (based on 1.48 volts) for at least six hours. Methane was fed to the anode at a rate of 1 ml/min., and aqueous potassium hydroxide (25% w/v) was fed to the cathode at a rate of 0-10. The product stream exiting the anode was analyzed using gas chromatography. In order to calibrate the instrument, various solutions of methanol ranging in concentration from 1 to 5 moles were prepared, each in an aqueous solution of 25% w/v potassium hydroxide. A plot of GC signal (mV) versus molar concentration of methanol was prepared for use as a calibration curve.

The results are summarized in Table 1. The column entitled "observations" indicates the combinations of anode electrode configuration and catalyst, and separator membrane, that resulted in large methanol peaks as an indicator of good methane to methanol conversions. In general, the catalyst combinations of $Ni(OH)_2$ with CoO and $CeO_2$, as well as $Ni(OH)_2$ with $CeO_2$, resulted in the largest methanol peaks in the product stream using various materials for the membrane separator.

TABLE 1

| Example | Anode | Membrane | Cathode | Observations |
|---|---|---|---|---|
| 1 | Ni(OH)2/CoO(9:1)/FEP/A3 [73:20:7] painted on Carbon Cloth | Daramic | Pt/C | methanol peak small hump |
| 2 | Ni(OH)2/CoO(9:1)/FEP/A3 [73:20:7] painted on Carbon Cloth | Vilene separator | Pt/C | too much solution cross over, no methanol peak, lots of O2 peak |
| 3 | Ni(OH)2/CoO(9:1)/FEP/A3 [73:20:7] sprayed on Carbon Felt | Hexane washed Daramic | Pt/C | methanol peak not significant |
| 4 | Ni(OH)2/CoO(9:1)/FEP/A3 [73:20:7] Tokuyama membrane, 3.6 mg/cm2(cat) | sprayed on | Pt/C | methanol peak not significant |
| 5 | Ni(OH)2/(Ag/C)(9:1)/A3/FEP [70:5:25] on Ni foam (KOH soaked), 50 mg/cm2(cat) | Tokuyama (KOH soaked) | Pt/C | flow rate very small. at 80° C. significant methanol peak |
| 6 | Ni(OH)2/Pt(9:1)/A3/FEP [70:5:25] on Ni foam (KOH soaked), 46 mg/cm2(cat) | Tokuyama (KOH soaked) | Pt/C | |
| 7 | Ni(OH)2/Ag/C/PbO (60:5:5)/A3/FEP [70:5:25] on Ni foam, 49 mg/cm2(cat) | Tokuyama (KOH soaked) | Pt/C | |
| 8 | Ni(OH)2/Ag/C/CeO2(90:5:5)/ A3/FEP [70:5:25], 49 mg/cm2 (cat) | Tokuyama (KOH soaked) | Pt/C | methanol peak very good (small CO2 peak, O2 peak big) at 1.48V, 76° C. |
| 9 | Ni(OH)2/Ag/C(1:1)/A3/FEP [70:5:25] sprayed on Ni foam, 40 mg/cm2(cat) | Tokuyama (KOH soaked) | Pt/C | methanol peak very good (small CO2 peak, O2 peak big) at 1.48V, 76° C., MeOH peak not as high as Ni(OH)2/Ag/C/CeO2 |
| 10 | Ni(OH)2/Ag2O(1:1)/A3/FEP [70:5:25] sprayed on Ni foam, 55 mg/cm2(cat) | Tokuyama (KOH soaked) | Pt/C | this is to study carbon content effect |

TABLE 1-continued

| Example | Anode | Membrane | Cathode | Observations |
|---|---|---|---|---|
| 11 | Ni(OH)2/Ag/C/CeO2(83:5:10)/A3/FEP [70:5:25] sprayed on Ni foam 54 mg/cm2(cat) | Tokuyama (KOH soaked) | Pt/C | this is to study CeO2 content effect |
| 12 | Ni(OH)2/CoO(9:1)Ag/C/CeO2 (90:5:5)/A3/FEP [70:5:25] sprayed on Ni foam 47 mg/cm2(cat) Ni(OH)2/CoO(9:1)/Ag/C/CeO2 (90:5:5)/A3/FEP [70:5:25] sprayed on Tokuyama membrane, 1.3 mg/cm2(cat) | Catalyst sprayed Tokuyama membrane | Pt/C | this is to study catalyst contact with membrane |
| 13 | Ni(OH)2/Ag/C/CeO2(90:5:5) A3/FEP [70:5:25] sprayed on hydrophobic Ni foam (teflon, 350 F.) 50 mg/cm2(cat) | Tokuyama (KOH soaked) | Pt/C | this is to prevent excess water on anode side, large MeOH peak |
| 14 | Ni(OH)2/Ag/C/CeO2(90:5:5)/A3/FEP [70:5:25] sprayed on hydrophobic Ni foam (teflon, 350 F.) 50 mg/cm2(cat) | Tokuyama (KOH soaked) | Pt/C | |
| 15 | Ni(OH)2/Ag/C/CeO2(90:5:5)/A3/FEP [45:5:50] sprayed on hydrophobic Ni foam (teflon, 350 F.) 60 mg/cm2(cat) | Tokuyama (KOH soaked) | Pt/C | this is to study more content of teflon on anode side. Current density is small. |
| 16 | Ni(OH)2/Ag/C/CeCO2(90:5:5)/A3/FEP [70:5:25] sprayed on hydrophobic carbon cloth 44 mg/cm2(cat) | Tokuyama (KOH soaked) | Pt/C | |
| 17 | Ni(OH)2/CoO/ZnO/Ni (90:6:1:3)/FEP [93:7] sprayed on hydrophobic carbon cloth 50 mg/cm2(cat), electrode heat treated 360 F. | Tokuyama (KOH soaked) | Pt/C | no MeOH found |
| 18 | Ni(OH)2/Ag/C/CeO2(85:5:10)/A3/FEP [70:5:25] sprayed on hydrophobic Ni Foam (teflon, 350 F.) 60 mg/cm2(cat) | Daramic | Pt/C | MeOH peak found |
| 19 | Ni(OH)2/CoO(9:1)/Ag/C/CeO2 (85:5:10)/A3/FEP [6O:20:2O] sprayed on Daramic membrane, hydrophobic carbon cloth as backing. | Daramic | Pt/C | MeOH peak found |
| 20 | Ni(OH)2/CoO(9:1)/Ag/C/CeO2 (85:5:10)/A3/FEP [60:20:20] sprayed on Daramic membrane, heat 62° C. for 3 h to get rid of VOC, hydrophobic carbon cloth as backing. | Daramic | Pt/C | big MeOH peak found |
| 21 | Ni(OH)2/CoO(9:1)/Ag/C/CeO2 (85:5:10)/KOH Nafion/FEP [50:20:30] sprayed on Daramic membrane, hydrophobic carbon cloth as backing | Daramic | Pt/C | big MeOH peak found |
| 22 | Ni(OH)2/CoO(9:1)/Ag/C/CeO2 (85:5:10)/KOH Nafion/FEP [50:20:30] sprayed on hydrophobic carbon cloth, 43 mg/cm2 | KOH Nafion 112 | Pt/C | big MeOH peak found |
| 23 | Ni(OH)2/CoO(9:1)/Ag/C/CeO2 (85:5:10)/KOH Nafion/FEP [50:20:30] sprayed on hydrophobic carbon cloth, 43 mg/cm2 | CG35 (1 layer) | Pt/C | big MeOH peak found, too much KOH solution crossover from cathode to anode |
| 24 | Ni(OH)2/CoO(9:1)/Ag/C/CeO2 (85:5:10)/KOH Nafion/FEP [50:20:30] sprayed on hydrophobic carbon cloth, 43 mg/cm2 | CG35 (2 layer) | Pt/C | found MeOH peak |
| 25 | Ni(OH)2/CoO(9:1)/Ag/C/CeO2 (85:5:10)/KOH Nafion/FEP [50:20:30] sprayed on hydrophobic carbon cloth, 5 mg/cm2, hot press 200 F./4000 lb/ 5 min | CG35 (2 layer) | Pt/C | found MeOH peak |
| 26 | Ni(OH)2/CoO(9:1)/Ag/C/CeO2 (85:5:10)/KOH Nafion/FEP [50:20:30] sprayed on hydrophobic carbon cloth, | CG35 (1 layer) | Pt/C | found MeOH peak |

TABLE 1-continued

| Example | Anode | Membrane | Cathode | Observations |
|---|---|---|---|---|
| 27 | 5 mg/cm2, hot press 200 F./4000 lb/5 min Ni(OH)2/CoO(9:1)/Ag/C/CeO2 (85:5:10)/FEP [70:30] sprayed on hydrophobic carbon cloth, 5 mg/cm2, hot press 200 F./4000 lb/5 min | CG35 (2 layer) | Pt/C | this is to study anode without Nafion |

Examples 28-33

For Examples 28-33, a small reactor was used having an area of about 30 cm$^2$ for the anode and cathode and the membrane separator. The membrane separator was an anionic electrolyte membrane sold by Tokuyama (Japan) under the product name AEM A201. The metal oxide catalyst present at the anode was nickel hydroxide, Ni(OH)$_2$, coated onto a graphite cloth sold by Zoltek under the product name PANEX® 30. The hydrogen recovery catalyst present at the cathode was platinum metal, coated onto a layer of graphite.

The current to the reactor was varied using a cell voltage of 1.30 volts (Example 28), 1.35 volts (Example 29), 1.40 volts (Example 30), 1.43 volts (Example 31), 1.45 volts (Example 32) and 1.50 volts (Example 33). Methane was fed to the anode at a constant rate of 1 ml/min. Aqueous potassium hydroxide (25% w/v) was fed to the cathode at a constant rate of 10 ml/min. For each change in voltage, the reactor was allowed to reach steady state, requiring a time period of at least 3 min.

Figure 2:
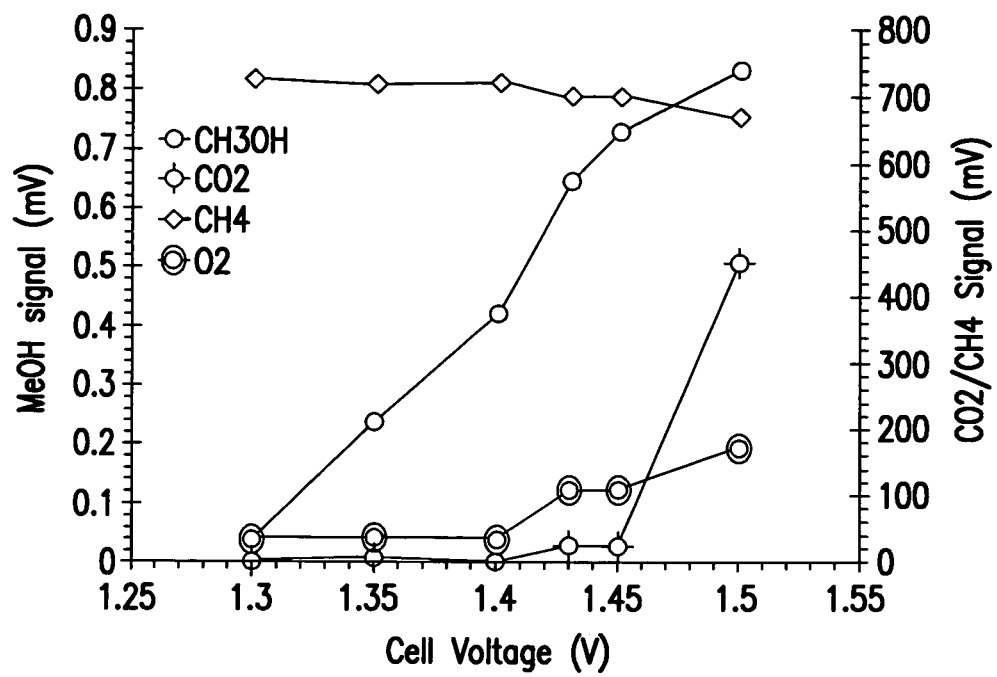
FIG. 2 is a graph comparing methanol signal and methane, carbon dioxide and oxygen signals, all as a function of cell voltage, according to reactor experiments as described in the Examples.

The methanol signal at the exit stream from the anode was measured using gas chromatography, as described above. The signals for methane, carbon dioxide and oxygen were also measured and recorded. The results are plotted in FIG. 2. As shown, the methanol signal (indicative of methane to methanol conversion) increased substantially as the cell voltage was increased, while the methane signal fell. The oxygen signal increased very slowly with voltage and did not spike. The carbon dioxide signal increased very slowly at voltages up to 1.45 volts, then spiked at 1.5 volts.

Figure 3:
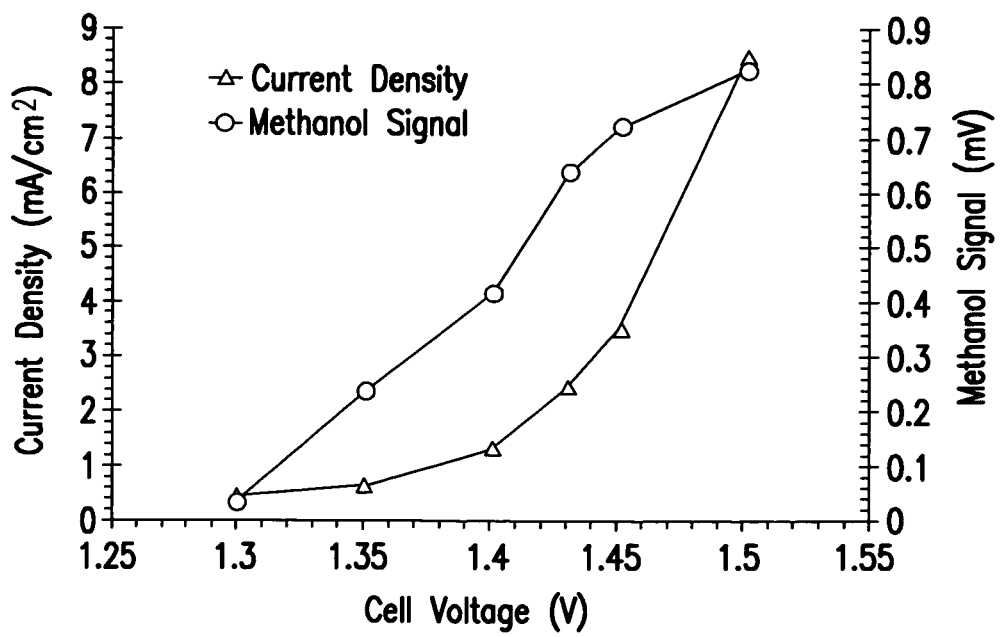
FIG. 3 is a graph comparing methanol signal to current density and cell voltage, according to reactor experiments described in the Examples.

FIG. 3 is a plot comparing methanol signal and current density as a function of increasing voltage. Overall, the methanol signal increased proportionally to the current density between 1.30 and 1.50 volts. However, the methanol signal increased faster than current density at intermediate voltages.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

I claim:

1. A method of converting methane to methanol, comprising the steps of:
   providing a reactor including an anode, a cathode, and a membrane separator between the anode and the cathode;
   feeding methane to the anode, and electrochemically converting the methane to methanol and electrons in the presence of a metal oxide catalyst at the anode;
   feeding an aqueous alkaline solution to the cathode;
   conducting the electrons to the cathode, thereby transforming water at the cathode to hydrogen gas and hydroxide ions;
   transforming the hydroxide ions through the membrane separator to the anode, causing regeneration of the metal oxide catalyst; and
   recovering the methanol from the reactor.

2. The method of claim 1, wherein the membrane separator includes an anode side and a cathode side, further comprising the steps of providing the metal oxide catalyst on the anode side and providing a hydrogen evolution catalyst on the cathode side.

3. The method of claim 2, wherein the hydrogen evolution catalyst comprises a metal selected from platinum, iron, ruthenium, osmium, and combinations thereof.

4. The method of claim 1, wherein the membrane separator comprises a porous layer containing an alkaline polymer electrolyte.

5. The method of claim 1, wherein the membrane separator comprises a porous layer containing an acidic polymer electrolyte.

6. The method of claim 1, wherein the membrane separator comprises a porous layer containing both an alkaline polymer electrolyte and an acidic polymer electrolyte.

7. The method of claim 1, wherein the metal oxide catalyst comprises a metal selected from the group consisting of nickel, cobalt, copper, silver, platinum gold, cerium, lead, iron, manganese, zinc, and combinations thereof.

8. The method of claim 1, wherein the metal oxide catalyst is selected from the group consisting of nickel hydroxide, iron hydroxide, zinc hydroxide, manganese hydroxide, cobalt hydroxide, and combinations thereof.

9. The method of claim 1, further comprising the step of feeding an aqueous acid solution to the cathode.

* * * * *